United States Patent
Uchiyama et al.

(10) Patent No.: US 10,515,459 B2
(45) Date of Patent: Dec. 24, 2019

(54) IMAGE PROCESSING APPARATUS FOR PROCESSING IMAGES CAPTURED BY A PLURALITY OF IMAGING UNITS, IMAGE PROCESSING METHOD, AND STORAGE MEDIUM STORING PROGRAM THEREFOR

(71) Applicant: CANON KABUSHIKI KAISHA, Tokyo (JP)

(72) Inventors: Hiroyuki Uchiyama, Kawasaki (JP); Kotaro Yano, Tokyo (JP); Ichiro Umeda, Tokyo (JP); Muling Guo, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/670,796

(22) Filed: Aug. 7, 2017

(65) Prior Publication Data

US 2018/0047184 A1    Feb. 15, 2018

(30) Foreign Application Priority Data

Aug. 10, 2016 (JP) .................................. 2016-157932

(51) Int. Cl.
G06K 9/36        (2006.01)
G06T 7/80        (2017.01)

(52) U.S. Cl.
CPC ...... *G06T 7/80* (2017.01); *G06T 2207/20092* (2013.01); *G06T 2207/30204* (2013.01)

(58) Field of Classification Search
CPC ............. G06T 7/80; G06T 2207/20092; G06T 2207/30244; G06T 7/70; G06T 17/10;
(Continued)

(56) References Cited

U.S. PATENT DOCUMENTS 9,230,326 B1* 1/2016 Liu ........................... G06T 7/80
2007/0070201 A1* 3/2007 Yokomitsu .............. G06T 7/246
348/169

(Continued)

FOREIGN PATENT DOCUMENTS

JP          5454573 B2      3/2014

OTHER PUBLICATIONS

Mami Noguchi, et al.—Calibration of a Plurality of Cameras without Synchronization by Marker Pursuit, Information Processing Society of Japan Study Report—Computer Vision and Image Media (CVIM) 2005.

(Continued)

*Primary Examiner* — Bhavesh M Mehta
*Assistant Examiner* — Ian L Lemieux
(74) *Attorney, Agent, or Firm* — Canon U.S.A., Inc. IP Division

(57) ABSTRACT

An image processing apparatus includes a detection unit configured to detect positions of an index of which an arrangement is sequentially changed from respective images captured by two imaging devices, a calibration unit configured to calibrate a position of at least one of the two imaging devices based on the positions of the index arranged at an identical position detected from the respective images captured by the two imaging devices, a determination unit configured to determine a candidate position where the index is to be newly arranged based on the positions where the index has already been detected, and a presentation unit configured to present the candidate position.

12 Claims, 10 Drawing Sheets

(58) Field of Classification Search
CPC ....... G06T 2200/08; G06T 2207/10016; G06T 2207/30196; G06T 2207/30201; G06T 2207/30204
See application file for complete search history.

(56) References Cited

U.S. PATENT DOCUMENTS

| | | | | |
|---|---|---|---|---|
| 2008/0107307 | A1* | 5/2008 | Altherr | H04N 5/23248 382/107 |
| 2008/0292131 | A1* | 11/2008 | Takemoto | H04N 13/246 382/100 |
| 2009/0046152 | A1* | 2/2009 | Aman | A63B 24/0021 348/157 |
| 2011/0025853 | A1* | 2/2011 | Richardson | H04N 5/2256 348/159 |
| 2013/0343606 | A1* | 12/2013 | Dal Mutto | G06K 9/00355 382/103 |
| 2014/0140576 | A1* | 5/2014 | Ikeda | G06K 9/00771 382/103 |
| 2016/0275683 | A1* | 9/2016 | Sakano | G06T 7/80 |
| 2017/0054965 | A1* | 2/2017 | Raab | G01C 11/02 |

OTHER PUBLICATIONS

Richard Hartley and Andrew Zisserman—Multiple View Geometry in Computer Vision Second Edition, Cambridge University Press 2003, pp. 262-264, pp. 290-292.

Zhengyou Zhang—A Flexible New Technique for Camera Calibration, IEEE Transactions on Pattern Analysis and Machine Intelligence, 22 (11): 1330-1334. Mar. 25, 1999.

Pierre Moulon, et al.—Adaptive structure from motion with a contrario model estimation, ACCV2012.

* cited by examiner

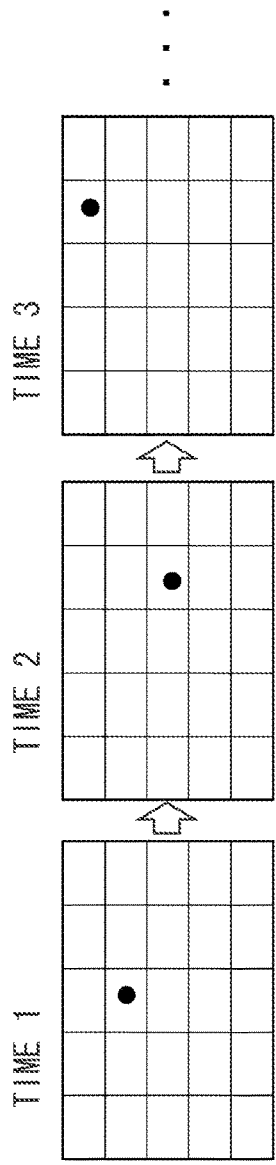

IMAGE PROCESSING APPARATUS FOR PROCESSING IMAGES CAPTURED BY A PLURALITY OF IMAGING UNITS, IMAGE PROCESSING METHOD, AND STORAGE MEDIUM STORING PROGRAM THEREFOR

BACKGROUND

Field of the Disclosure

The present disclosure relates to an image processing apparatus for processing images captured by a plurality of imaging units, an image processing method, and a storage medium for storing a program therefor.

Description of the Related Art

A conventional technique used in a monitoring camera system is known to capture images of an identical subject at the same time by using a plurality of cameras arranged in a monitoring area, and estimate the three-dimensional position of the subject. Japanese Patent No. 5454573 discusses a technique for estimating the three-dimensional position based on the principle of stereo viewing based on the positions and orientations of cameras and the positions of a subject on camera images. In a multi-camera system handling such three-dimensional information, it is necessary to predetermine the positions and orientations of the cameras through calibration.

Mami Noguchi and Takekazu Kato, "Calibration of A Plurality of Cameras without Synchronization by Marker Pursuit", Information Processing Society of Japan Study Report-Computer Vision and Image Media (CVIM) 2005 discusses a method for estimating the position of a camera by detecting a calibration marker (hereinafter referred to as a marker) from a moving image by using a plurality of cameras. A marker refers to an object having a characteristic color and shape which make it easier to identify the positional coordinates on an image. For example, a ball having a color different from the surrounding color is used as a marker. The positions and orientations of cameras can be obtained by using parameters related to the positions and orientations of the cameras as unknown variables and resolving the variables with the coordinates of the marker on the image as an input. As a method for obtaining the positions and orientations of cameras based on the coordinates of markers on an image, a technique for calculating a fundamental matrix and a technique with Structure from Motion are known (refer to Richard Hartley and Andrew Zisserman "Multiple View Geometry in Computer Vision SECOND EDITION" Cambridge University Press 2003).

However, when determining the positions and orientations of cameras, the above-described conventional techniques cannot obtain the correct positions and orientations of the cameras unless a detection result is obtained for the suitable number of markers at suitable positions. Therefore, there has been a problem of degraded accuracy in estimating the positions and orientations of cameras. For example, if marker acquisition positions are not uniformly arranged, i.e., marker acquisition positions exist only in a specific portion of an image, the solution excessively adapts only to the specific portion resulting in large errors in other portions. Further, it is difficult for a user to grasp suitable marker positions and the suitable number of markers in order to preferably perform calibration.

SUMMARY

The present disclosure is directed to accurately performing calibration of the positions and orientations of cameras by detecting the suitable number of markers at suitable positions.

According to an aspect of the present disclosure, an image processing apparatus includes a detection unit configured to detect positions of an index of which an arrangement is sequentially changed from respective images captured by two imaging devices, a calibration unit configured to calibrate a position of at least one of the two imaging devices based on the positions of the index arranged at an identical position detected from the respective images captured by the two imaging devices, a determination unit configured to determine a candidate position where the index is to be newly arranged based on the positions where the index has already been detected, and a presentation unit configured to present the candidate position.

Further features of the present disclosure will become apparent from the following description of exemplary embodiments with reference to the attached drawings.

BRIEF DESCRIPTION OF THE DRAWINGS

FIGS. 7A, 7B, and 7C illustrate the counting of the number of marker points according to one or more aspects of the present disclosure.

DESCRIPTION OF THE EMBODIMENTS

Exemplary embodiments of the present disclosure will be described below with reference to the accompanying drawings.

Figure 1:
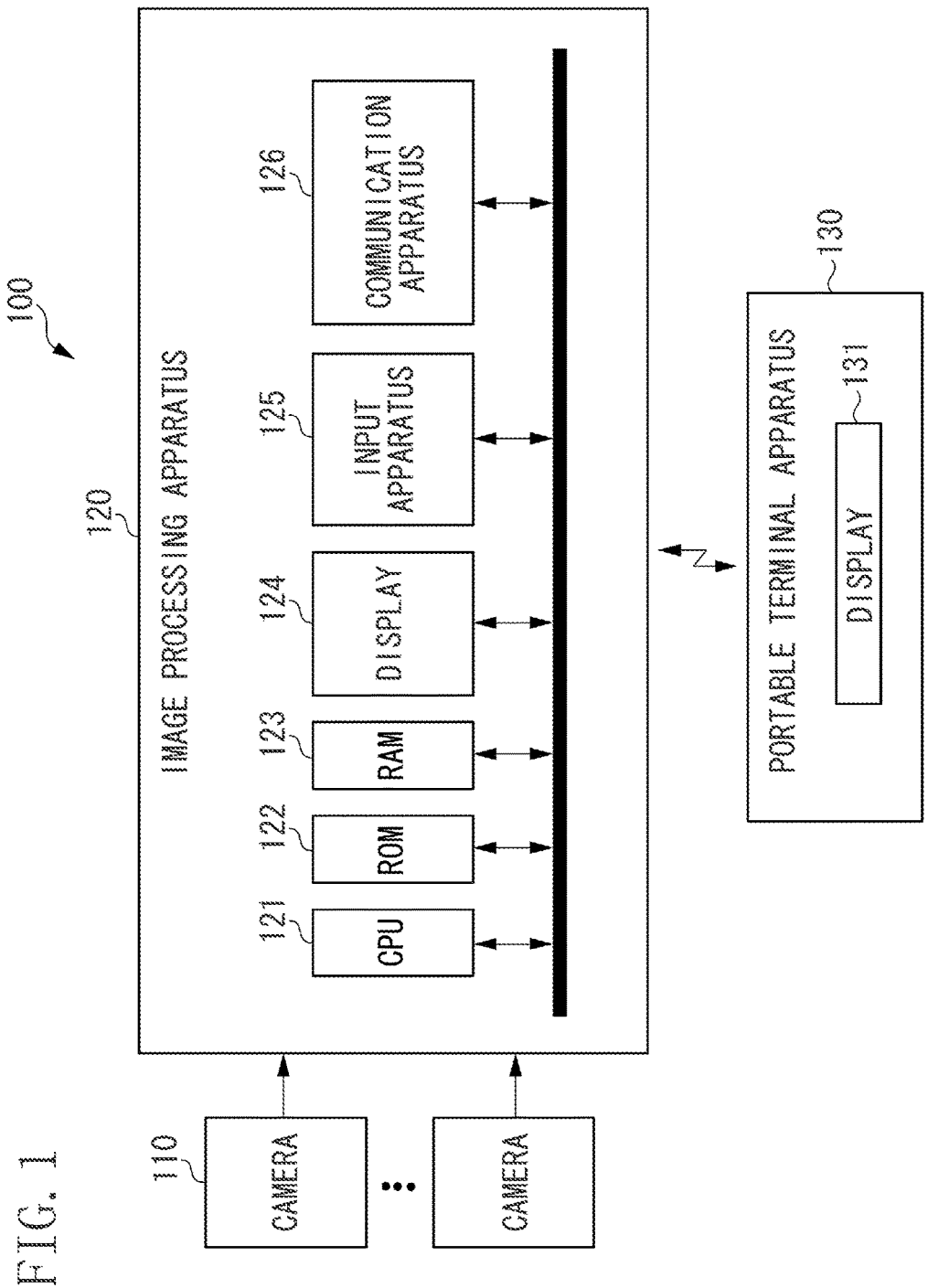
FIG. 1 illustrates an overall configuration of an image processing system according to one or more aspects of the present disclosure.

FIG. 1 illustrates an overall configuration of an image processing system 100 according to the present exemplary embodiment. The image processing system 100 includes a plurality of cameras 110, an image processing apparatus 120, and a portable terminal apparatus 130. The cameras 110 serving as monitoring cameras are assumed to be installed at predetermined positions in a monitoring area. Each of the cameras 110 processes a time series signal related to a subject image captured by an image sensor and converts the time series signal into a digital signal to obtain an image. Although, in the present exemplary embodiment, the image processing system 100 includes four cameras 110, the number of the cameras 110 is not limited to four and may be two or more.

The image processing apparatus 120 detects a suspicious individual from images captured by the four cameras 110. To correctly identify the position of the suspicious individual, the image processing apparatus 120 performs calibration on the installation positions and orientations of the cameras 110. To perform calibration on the positions and orientations of the cameras 110, the cameras 110 capture images of a marker at respective positions while a user holding the marker in a hand is walking about the monitoring area. The marker used for calibration is assumed to be, for example, a red ball. Then, the image processing apparatus 120 performs calibration on the positions and orientations of the cameras 110 based on the images of the marker captured by the cameras 110.

The cameras 110 are connected to the image processing apparatus 120. The portable terminal apparatus 130 is connected to the image processing apparatus 120 via a network such as a wireless local area network (LAN). The portable terminal apparatus 130 is held by the user together with the marker. A display 131 of the portable terminal apparatus 130 displays information indicating the location where the user should move to next. The communication between the image processing apparatus 120 and the portable terminal apparatus 130 may be wireless communication other than wireless LAN communication or may be priority communication. Although the portable terminal apparatus 130 is a dedicated terminal, the portable terminal apparatus 130 may be a general-purpose tablet, a notebook personal computer (PC), a smart phone, or a head mounted display as another example. The portable terminal apparatus 130 may not be held by the user but be fixed to a predetermined location together with the image processing apparatus 120.

The image processing apparatus 120 includes a central processing unit (CPU) 121, a read only memory (ROM) 122, a random access memory (RAM) 123, a display 124, input devices 125, and a communication apparatus 126. The CPU 121 controls the entire image processing apparatus 120 by executing a control program stored in the ROM 122. The ROM 122 stores the control program executed by the CPU 121 and various kinds of parameter data. The RAM 123 stores images and various kinds of information. The RAM 123 functions as a work area or a temporary data saving area for the CPU 121. The display 124 displays various kinds of information. The input devices 125 include a pointing device such as a mouse and a keyboard which receive an input from the user.

The functions and processing of the image processing apparatus 120 (described below) are implemented when the CPU 121 reads a program stored in the ROM 122 and executes the program. As another example, part or all of the functions and processing of the image processing apparatus 120 may be implemented by hardware such as an electronic circuit. The hardware configuration of the portable terminal apparatus 130 is similar to the hardware configuration of the image processing apparatus 120.

Figure 2:
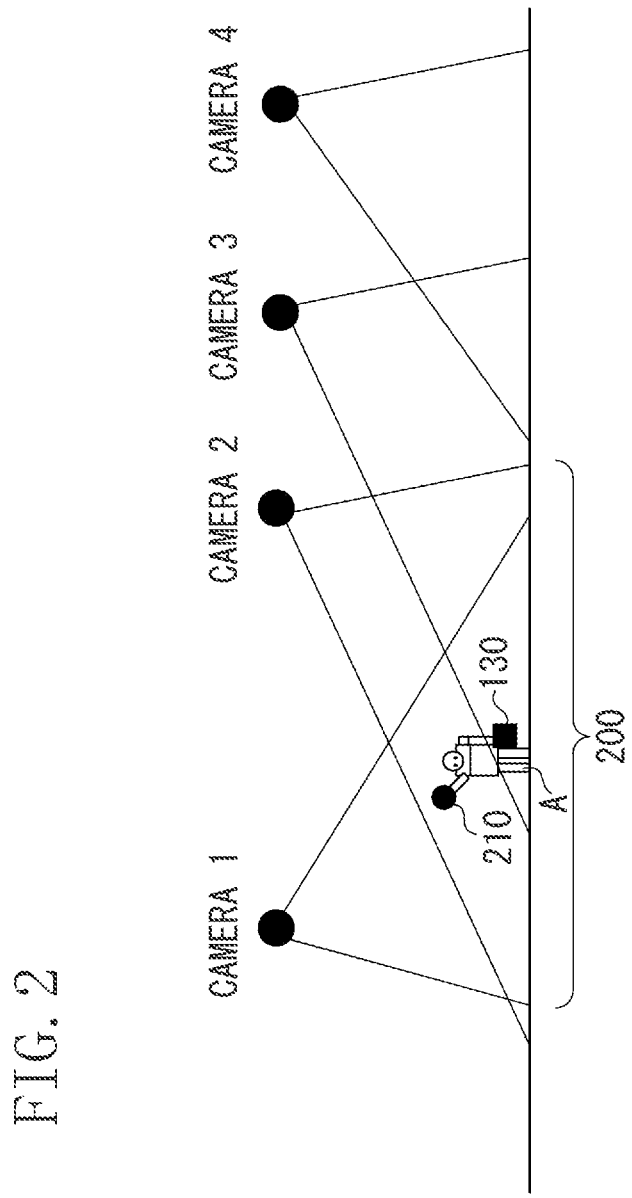
FIG. 2 illustrates a monitoring area according to one or more aspects of the present disclosure.

FIG. 2 illustrates a monitoring area. As illustrated in FIG. 2, the four cameras 110 are assumed to be installed so that respective imaging ranges overlap with each other. For example, imaging ranges of a camera 1 and a camera 2 include an identical area 200. As illustrated in FIG. 2, a user A holds a marker 210 and the portable terminal apparatus 130. The user A holds the marker 210 in a hand and walks about the monitoring area in an autonomous way or according to information displayed on the portable terminal apparatus 130.

Figure 3:
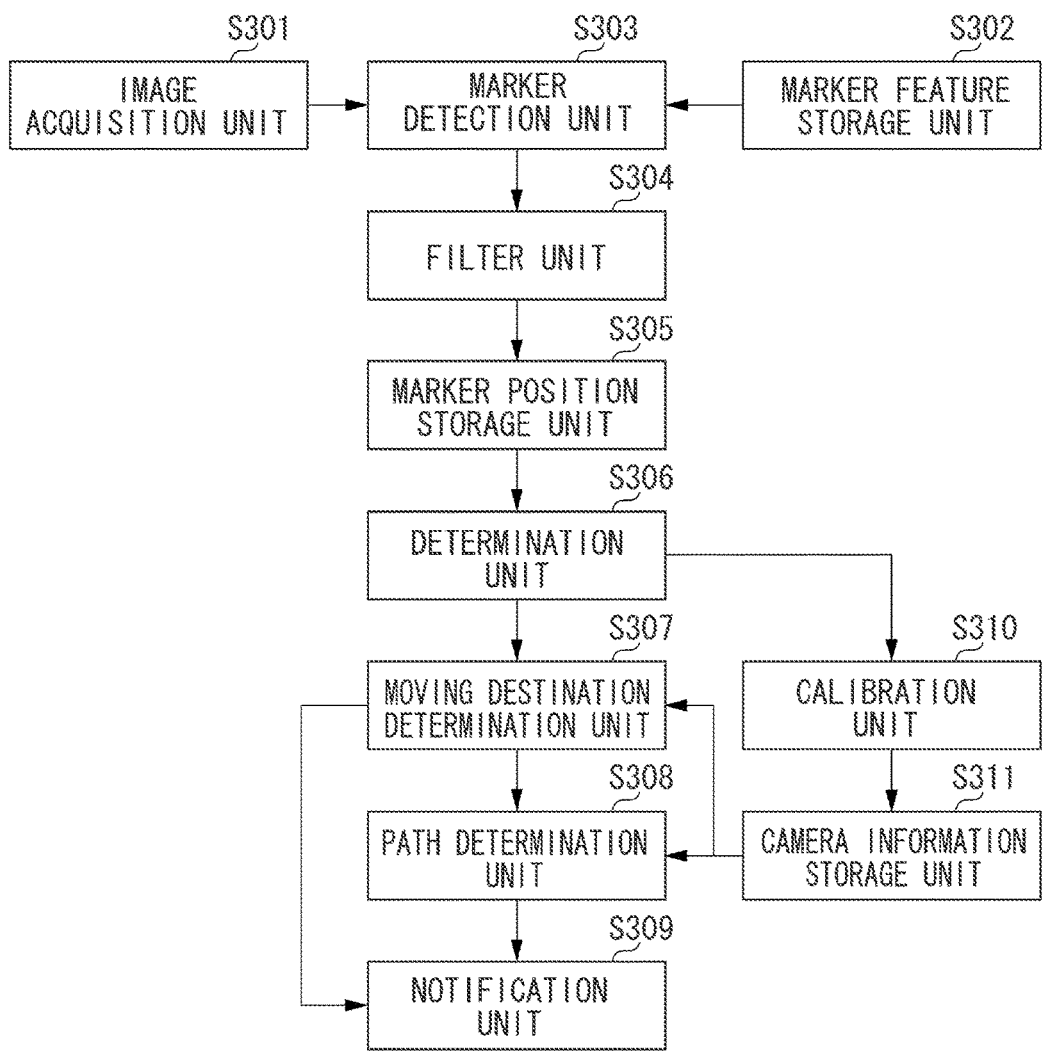
FIG. 3 illustrates a software configuration of an image processing apparatus according to one or more aspects of the present disclosure.

FIG. 3 illustrates a software configuration of the image processing apparatus 120. The image processing apparatus 120 includes an image acquisition unit 301, a marker feature storage unit 302, a marker detection unit 303, a filter unit 304, a marker position storage unit 305, and a determination unit 306. The image processing apparatus 120 further includes a moving destination determination unit 307, a path determination unit 308, a notification unit 309, a calibration unit 310, and a camera information storage unit 311.

The camera information storage unit 311 stores information about an internal parameter of each camera 110 predetermined by performing calibration on the internal parameter of the camera 110. According to the present exemplary embodiment, the internal parameter is assumed to be the focal length. For the calibration of the internal parameter, the following document can be referenced.

Zhengyou Zhang "A Flexible New Technique for Camera Calibration", IEEE Transactions on Pattern Analysis and Machine Intelligence, 22 (11): 1330-1334, 2000

The marker feature storage unit 302 prestores information about the features of a detection target marker. According to the present exemplary embodiment, the feature of a marker is assumed to be the color of the marker. The image acquisition unit 301 acquires an image from each camera 110. The marker detection unit 303 detects the marker from the images acquired by the image acquisition unit 301 and identifies the positional coordinates on the images. The filter unit 304 extracts a marker group usable for calibration from a marker group detected by the marker detection unit 303 and stores the positional coordinates of each marker of the extracted marker group in the marker position storage unit 305. A specific method for extracting a usable marker group will be described below. The marker position storage unit 305 stores the positional coordinates of markers on the image.

Using the positional coordinates of markers stored in the marker position storage unit 305 and the internal parameters of the cameras 110 stored in the camera information storage unit 311, the calibration unit 310 performs calibration on the positions and orientations of the cameras 110 to determine the positions and orientations thereof. The moving destination determination unit 307 determines moving destinations of the marker based on images. The path determination unit 308 determines a moving path of the marker based on the moving destinations of the marker. The notification unit 309 outputs to the portable terminal apparatus 130 moving destination information including the moving destinations determined by the moving destination determination unit 307 and the moving path determined by the path determination unit 308.

Figure 4:
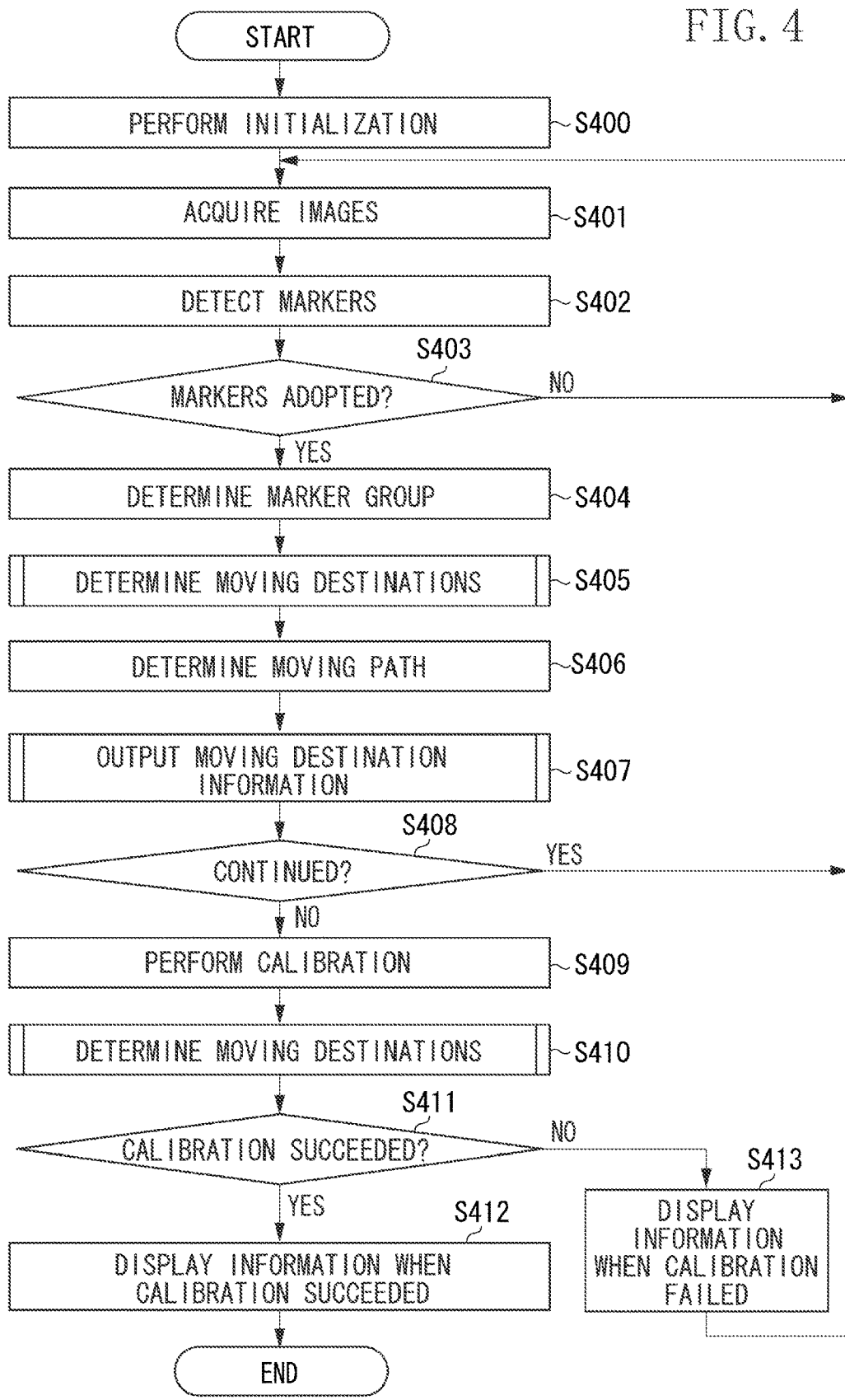
FIG. 4 is a flowchart illustrating image processing according to one or more aspects of the present disclosure.

FIG. 4 is a flowchart illustrating image processing performed by the image processing apparatus 120. In step S400, the CPU 121 initializes the image processing system. The CPU 121 first acquires the pre-acquired internal parameter of each camera 110 from the camera information storage unit 311. Then, the CPU 121 acquires the preset marker color from the marker feature storage unit 302. The marker color is used for processing for detecting a marker from the image. In step S401, the image acquisition unit 301 acquires images captured at the same time from the cameras 110. According to the present exemplary embodiment, the image acquisition unit 301 acquires four different images from the four cameras 110.

In step S402, the marker detection unit 303 detects a marker from each image by using the marker color stored in the marker feature storage unit 302 to identify the positional coordinates of the detected marker. Specifically, the marker detection unit 303 converts an image into the Hue Saturation Value (HSV) color space and extracts candidate pixels with which the difference from the value of the marker hue stored in the marker feature storage unit 302 is a threshold value α or below. When the number of candidate pixels is a threshold value β or below, the marker detection unit 303 determines that no marker has been detected from the image. When the number of candidate pixels exceeds the threshold value β, the marker detection unit 303 determines that a marker has been detected. In this case, the marker detection unit 303 performs labelling processing on the candidate pixels and identifies the center of gravity of the area having the largest number of candidate pixels as a marker position. This processing is an example of identification processing for identifying a marker position.

In step S403, the filter unit 304 determines whether the marker group detected in step S402 is to be adopted for calibration. When the filter unit 304 determines to adopt the marker group for calibration (YES in step S403), the processing proceeds to step S404. On the other hand, when the filter unit 304 determines not to adopt the marker group for calibration (NO in step S403), the marker group is canceled and the processing returns to step S401. The filter unit 304 determines whether to adopt a marker group by determining whether the detected marker group includes a marker having a similar position to any marker in the past marker group stored in the marker position storage unit 305. Since the calibration accuracy will degrade if a marker group concentrates in a specific portion, this processing prevents such marker group concentration.

More specifically, the filter unit 304 performs the following processing. The filter unit 304 considers the marker group detected from the image group obtained in step S401 as a marker group A, and considers a marker group at certain past time stored in the marker position storage unit 305 as a marker group B. ai and bi (i=1, 2, . . . , C) indicates vectors representing the positional coordinates of markers included in the marker groups A and B, respectively. C indicates the number of cameras 110. i indicates the index of the cameras 110. The filter unit 304 obtains a degree of difference f(A,B) between the positions of the marker groups A and B by using the formula 1.

$$f(A, B) = \sum_{i=1}^{c} d(a_i, b_i) \quad \text{(Formula 1)}$$

where $d(a_i, b_i) = \|a_i - b_i\|$ (when both markers of $a_i$ and $b_i$ are detected) or ∞ (otherwise). The symbol $\| \ \|$ denotes a norm of a vector. Specifically, the sum of the distances between markers detected by the same camera is defined as the degree of difference f(A,B). However, if no marker is detected and the distance cannot be obtained, the distance is set to infinite. When none of the marker groups stored in the past has the degree of difference f(A,B) (calculated by the formula 1) which is a threshold value or below, the filter unit 304 determines to adopt the detected marker group.

In step S404, the filter unit 304 records the marker group detected in step S402 in the marker position storage unit 305. In step S405, the moving destination determination unit 307 determines moving destinations of the marker, i.e., candidate marker positions corresponding to the marker images required for calibration. This processing is an example of determination processing for determining moving destinations of the marker.

Figure 5:
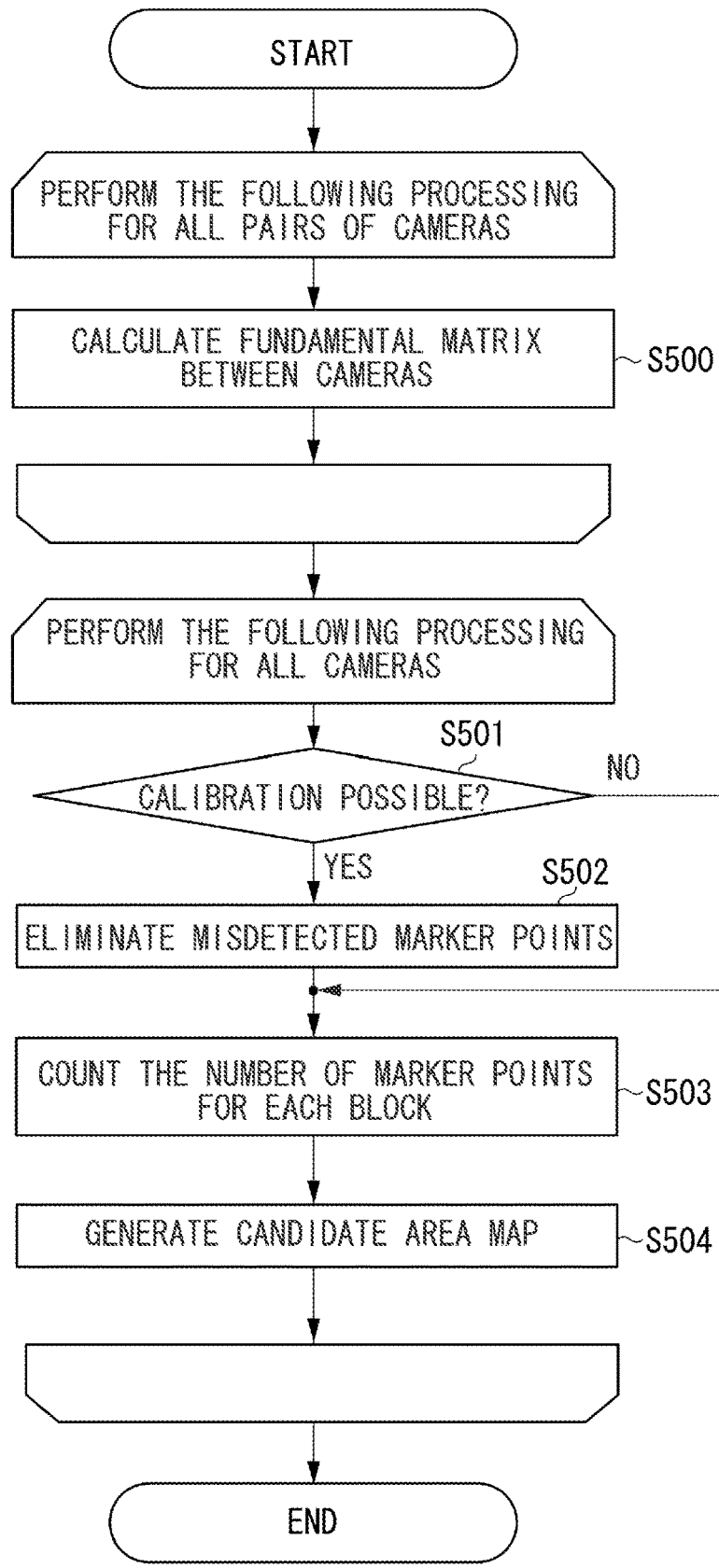
FIG. 5 is a flowchart illustrating moving destination determination processing according to one or more aspects of the present disclosure.

FIG. 5 is a flowchart illustrating moving destination determination processing (S405) performed by the moving destination determination unit 307. The moving destination determination unit 307 repetitively performs processing in step S500 for all pairs of the four cameras 110. According to the present exemplary embodiment, since four cameras 110 exist, there are six different combinations of the cameras 110, and the moving destination determination unit 307 repetitively performs the processing in step S500 six times.

In step S500, the moving destination determination unit 307 calculates a fundamental matrix between the cameras 110 based on the positional coordinates of the markers. The fundamental matrix is a 3×3 matrix including three-dimensional position and orientation information between the cameras. This fundamental matrix is used to determine whether calibration (described below) is possible and eliminate misdetected markers. The positional coordinates of misdetected markers are included in the positional coordinates of markers. To obtain a fundamental matrix even with such misdetected markers, the moving destination determination unit 307 calculates a fundamental matrix by using the Random Sample Consensus (RANSAC) method (refer to the above-described paper by Hartley and others). The RANSAC method repeats a process of selecting some samples at random and determining a model a plurality of times to select a model which matches data to the maximum extent, thus robustly calculating a model against outliers. However, it is known that a fundamental matrix cannot be correctly calculated in unsuitable cases, for example, if there is a small number of positional coordinates of markers or if markers are arranged on the same plane. Therefore, in step S500, if the moving destination determination unit 307 cannot calculate a fundamental matrix, a fundamental matrix is not calculated.

When fundamental matrixes are calculated for all pairs of the cameras 110, the moving destination determination unit 307 repeats the processing in steps S501 to S504 for all of the cameras 110. According to the present exemplary embodiment, since the four cameras 110 exist, the moving destination determination unit 307 repeats the processing in steps S501 to S504 four times. In step S501, the moving destination determination unit 307 determines whether calibration is possible. For a camera 110 having no marker point counterpart with which a fundamental matrix can be calculated in step S500, it is difficult to determine a three-dimensional positional relation with other cameras 110. Therefore, the moving destination determination unit 307 determines that calibration is not possible for such a camera 110. On the other hand, the moving destination determination unit 307 determines that calibration is possible for a camera 110 having a marker point counterpart with which a fundamental matrix can be calculated in step S500. This processing is an example of determination processing for determining whether calibration is possible based on marker positions. When the moving destination determination unit 307 determines that calibration is possible (YES in step S501), the processing proceeds to step S502. On the other hand, when the moving destination determination unit 307 determines that calibration is not possible (NO in step S501), the processing proceeds to step S503.

In step S502, the moving destination determination unit 307 eliminates misdetected markers from the marker point group by using the fundamental matrix. Specifically, the moving destination determination unit 307 searches for a marker point in another image corresponding to a certain marker point in the image by using the fundamental matrix. When there is no marker point counterpart, the moving destination determination unit 307 eliminates the marker point as a misdetected marker.

A certain point in an image captured by one camera 110 is projected on the image captured by another camera 110 as a straight line called an epipolar line. A relation between a fundamental matrix F, a certain point x in an image, and an epipolar line 1 is represented by the formula 2.

$$1 = Fx \qquad \text{(Formula 2)}$$

Figure 6A:
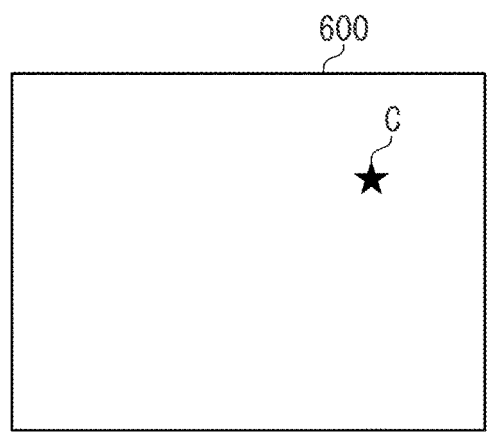
FIGS. 6A and 6B illustrate the elimination of a misdetected marker according to one or more aspects of the present disclosure.
Figure 6B:
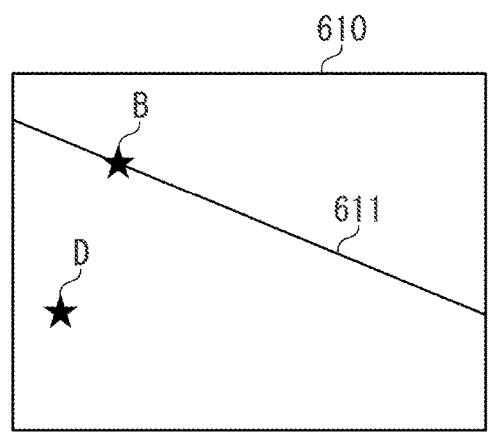

For a certain marker point x, the moving destination determination unit 307 generates the epipolar line 1 on the image of each of all other cameras 110. When there is no marker point of which the distance to the epipolar line 1 is a threshold value or below, the moving destination determination unit 307 determines that there is no marker point counterpart and eliminates the marker point x. FIGS. 6A and 6B illustrate the elimination of a misdetected marker. For example, suppose that an epipolar line 611 is obtained in an image 610 of the camera 2 illustrated in FIG. 6B based on the point of a marker C in an image 600 of the camera 1 illustrated in FIG. 6A. In this case, since the distance between a marker B and the epipolar line 611 is a threshold value or below, the marker C is considered to be a counterpart of the marker B.

In steps S503 and S504, the moving destination determination unit 307 identifies the distribution of the marker positions based on marker point groups which have been obtained since the past time till the processing time stored in the marker position storage unit 305 and generates a map indicating moving destination candidate areas. Specifically, in step S503, the moving destination determination unit 307 divides an image obtained by a camera 110 into 5×5 blocks and counts the number of detected marker points for each block. The moving destination determination unit 307 needs to divide the image into a plurality of areas, and the number of division areas and the shape and size of each area are not limited to the present exemplary embodiment. The moving destination determination unit 307 performs this operation for all of the cameras 110. The processing for counting the number of marker points in step S503 for one certain camera 110 will be described below with reference to FIGS. 7A to 7C. As illustrated in FIG. 7A, the moving destination determination unit 307 divides each of images including a marker obtained at a plurality of past times into 5×5 blocks. Then, the moving destination determination unit 307 counts the number of marker points in the images obtained at all the times for each block. Thus, marker counts are obtained for all blocks as illustrated in FIG. 7B.

In step S504, the moving destination determination unit 307 determines the degree of importance of each block (area) according to the marker counts measured in step S503. The degree of importance means the degree of necessity of the captured image at a marker position as a moving destination. Specifically, a higher degree of importance means a higher degree of necessity to collect the captured marker image. A smaller marker count obtained in step S503 is assumed to mean that the marker image collection is less sufficient. Therefore, the moving destination determination unit 307 determines to assign a higher degree of importance to a block having a smaller marker count. According to the present exemplary embodiment, the moving destination determination unit 307 assigns a degree of importance of 2 to a block with a marker count of 0, assigns a degree of importance of 1 to a block with a marker count of 1, and assigns a degree of importance of 0 to a block with a marker count of 2 or larger. Thus, a candidate area map illustrated in FIG. 7C is obtained. In the candidate area map, the degree of importance is assigned to each block. The moving destination determination unit 307 repeats the processing in steps S501 to S504 to generate a candidate area map for each camera 110.

Figure 8:
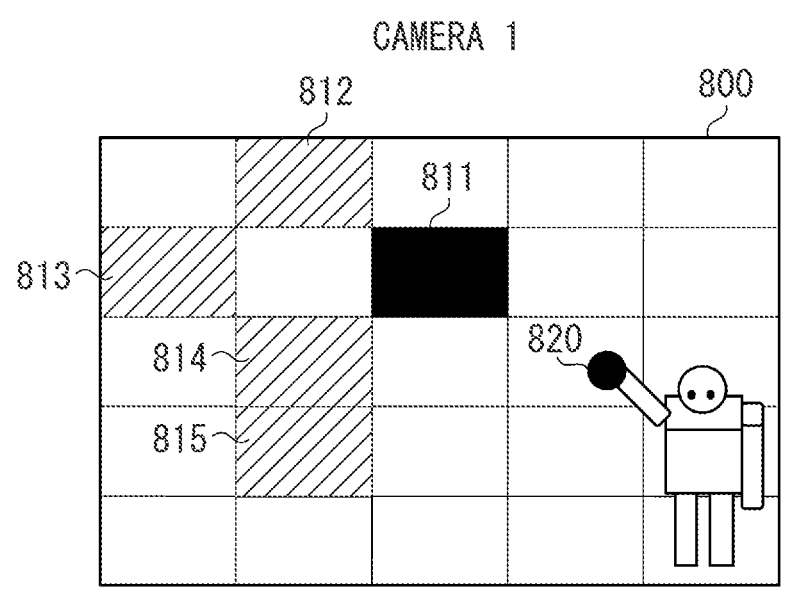
FIG. 8 illustrates an example of a candidate area map according to one or more aspects of the present disclosure.

Returning to FIG. 4, after the moving destination determination processing in step S405, the processing proceeds to step S406. In step S406, the path determination unit 308 determines a moving path based on a plurality of moving destinations and the degree of importance of each moving destination. More specifically, the path determination unit 308 determines a moving path for connecting between blocks so as to first move to blocks with a high degree of importance. For example, it is assumed that a candidate area map 800 illustrated in FIG. 8 is obtained for the camera 1. In the candidate area map 800, a block 811 is an area having the degree of importance 2 and blocks 812 to 815 are areas having the degree of importance 1. Further, suppose that a marker image is detected at the position corresponding to a block 820 of the candidate area map 800 at the time of processing. In this case, the path determination unit 308 determines a moving path for the movement from the block 820 to the blocks 811, 814, 815, 813, and 812 in this order.

Returning to FIG. 4, after the path determination unit 308 performs moving path determination processing in step S406, the processing proceeds to step S407. In step S407, the notification unit 309 outputs information about a moving destination (moving destination information) to the portable terminal apparatus 130 to display the information on the display 131 of the portable terminal apparatus 130. This processing is an example of processing for outputting the moving destination information. The moving destination information includes information of moving destinations, i.e., information indicating marker positions at which a marker image is required, information of the degree of importance of respective moving destinations, and information indicating a moving path passing through the respective moving destinations.

Figure 9:
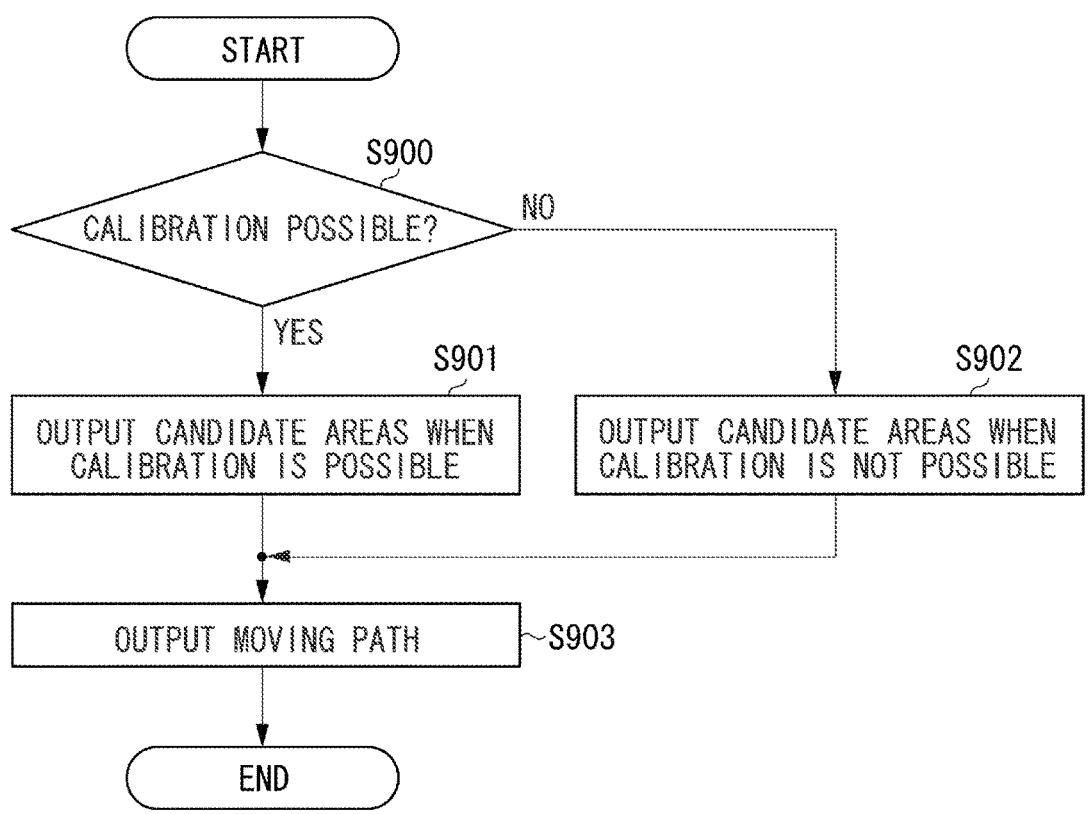
FIG. 9 is a flowchart illustrating moving destination information output processing according to one or more aspects of the present disclosure.

FIG. 9 is a flowchart illustrating detailed processing of the notification unit 309 in the moving destination information output processing in step S407. The notification unit 309 first repeats processing in steps S900 to S902 for all of the cameras 110. According to the present exemplary embodiment, since the four cameras 110 exist, the notification unit 309 repeats the processing in steps S900 to S902 four times.

In step S900, the notification unit 309 determines whether calibration is possible. The notification unit 309 needs to determine whether calibration is possible, with reference to the processing result in step S501. As yet another example, the notification unit 309 may determine whether calibration is possible by performing the same processing as the processing in step S501. When the notification unit 309 determines that calibration is possible (YES in step S900), the processing proceeds to step S901. On the other hand, when the notification unit 309 that calibration is not possible (NO in step S900), the processing proceeds to step S902.

Figure 10:
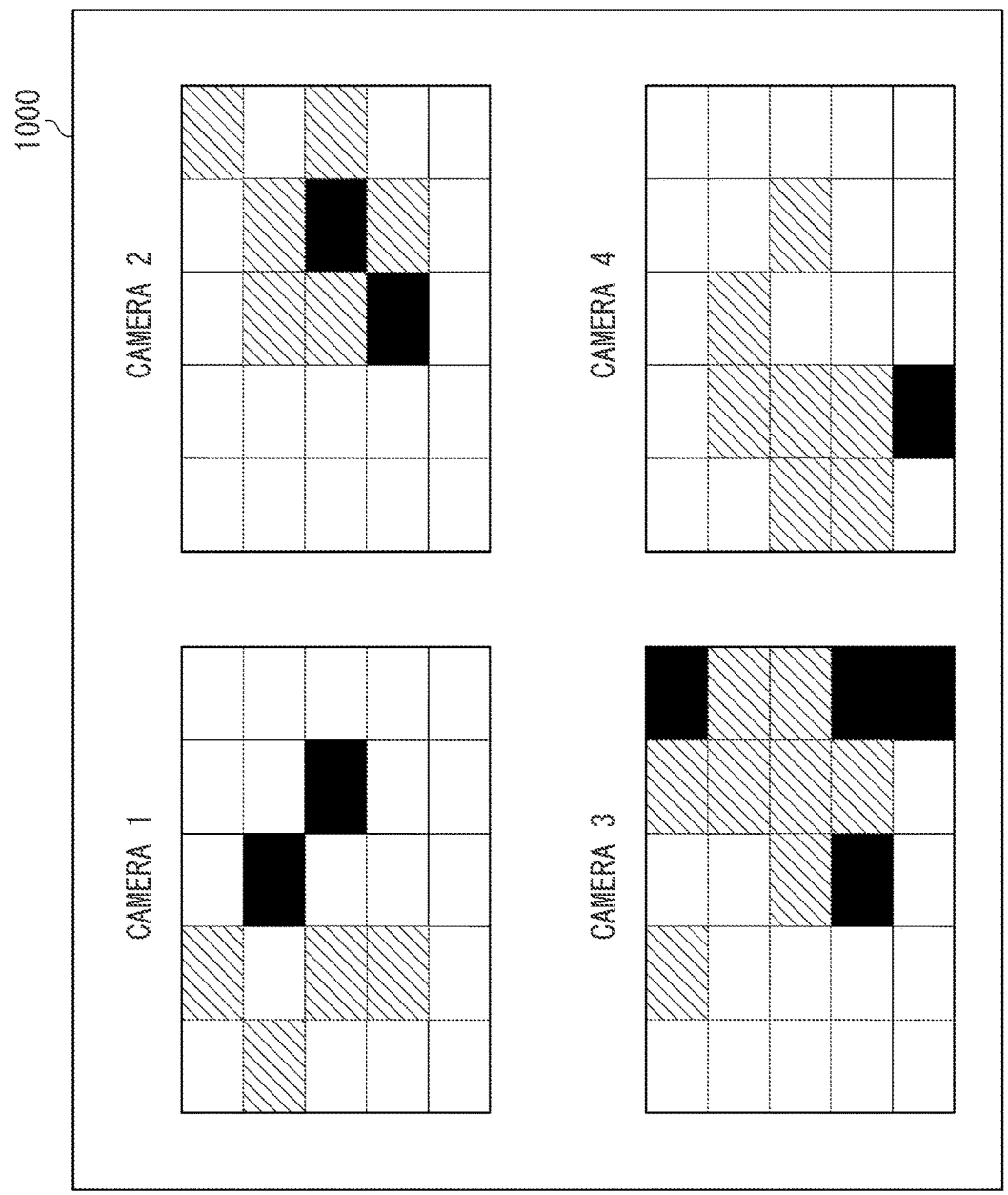
FIG. 10 illustrates an example of a moving destination candidate screen according to one or more aspects of the present disclosure.

In step S901, the notification unit 309 superimposes the candidate area map 800 onto the image obtained by the camera 110 and outputs the image to the portable terminal apparatus 130 to display the image on the display 131 of the portable terminal apparatus 130. Specifically, the notification unit 309 superimposes the candidate area map 800 with deeper red blocks having a higher degree of importance onto the image. Thus, areas where the marker image collection is more important are displayed in deeper red. In step S902, the notification unit 309 superimposes the candidate area map 800 onto the image obtained by the camera 110 and outputs the image to the portable terminal apparatus 130 to display the image on the display 131 of the portable terminal apparatus 130. In step S902, the notification unit 309 displays the candidate area map 800 in a color different from the color in step S901. According to the present exemplary embodiment, the notification unit 309 superimposes the candidate area map 800 with deeper blue blocks having a higher degree of importance onto the image. FIG. 10 illustrates an example of a moving destination candidate screen 1000 displayed on the display 131 of the portable terminal apparatus 130 which received images with the candidate area maps 800 superimposed thereon. More specifically, the moving destination candidate screen 1000 simultaneously displays four images with the candidate area maps 800 for the four cameras 110 respectively superimposed thereon.

In this way, the notification unit 309 performs control to output to the portable terminal apparatus 130 the candidate area map 800 to enable distinguishing between a case where calibration is possible and a case where calibration is not possible so that candidate moving destinations for each camera 110 are displayed on the display 131 of the portable terminal apparatus 130. This allows the user not only to know the moving destination but also to grasp whether calibration is possible for the camera 110 in a simultaneous and easy way.

The notification unit 309 needs to output the candidate area map 800 to allow the user to distinguish between a case where calibration is possible and a case where calibration is not possible. A specific method for this purpose is not limited to the exemplary embodiment. As another example, the notification unit 309 may distinguish the cases by using other colors, such as yellow and green. As yet another example, the notification unit 309 may use different graphics or symbols, for example, a round mark and a x mark. The notification unit 309 may also use different texts, for example, "Possible" and "Not possible". The notification unit 309 may also display the candidate area map 800 by using different blinking methods. Further, the output form of the candidate area map 800 on the portable terminal apparatus 130 is not limited to display and may be, for example, sound. In this case, the notification unit 309 needs to output different sound information according to whether calibration is possible or not.

When the processing in steps S900 to S902 is completed for all of the cameras 110, the processing proceeds to step S903. In step S903, the notification unit 309 outputs a moving path to the portable terminal apparatus 130 to display the moving path on the display 131 of the portable terminal apparatus 130. At this timing, the notification unit 309 also outputs sound information to allow the portable terminal apparatus 130 to output the moving path with sound. For example, suppose that the candidate area map 800 illustrated in FIG. 8 is generated for the camera 1. In this case, the notification unit 309 outputs to the portable terminal apparatus 130 a text indicating the moving path determined in step S406 so as to be further superimposed on the screen where the image and the candidate area map 800 are displayed. Thus, the moving path is further displayed on the display 131 of the portable terminal apparatus 130.

Text information is displayed as a moving path to guide the user to the left when the candidate area exists to the left of the marker, to the right when the candidate area exists to the right of the marker, to the back when the candidate area exists above the marker, or to the front when it exits below the marker. In the example illustrated in FIG. 8, the display 131 displays "Moves to the left back of the camera 1" and then a moving path indicating the movement to the left front, the left back, and the right back. Together with or instead of the moving path, the notification unit 309 may output the moving amount and moving path up to the moving destination block to the portable terminal apparatus 130 to display the moving amount and moving path on the portable terminal apparatus 130. The method for notifying the user of the moving path is not limited to the exemplary embodiment, and may be based on a color, a symbol or graphic such as an arrow, sound, movement such as blinking, and vibration. As yet another example, the notification unit 309 may display the moving path or the moving direction in a plan view such as a map. This completes moving destination information notification processing.

Returning to FIG. 4, after the notification unit 309 performs the moving destination information notification processing in step S407, the processing proceeds to step S408. In step S408, the CPU 121 determines whether to continue marker image capturing. According to the present exemplary embodiment, the CPU 121 determines to continue marker image capturing when calibration is determined to be not possible for any one of the cameras 110 or determines not to continue marker image capturing when calibration is determined to be possible for all of the cameras 110. When the CPU 121 determines to continue marker image capturing (YES in step S408), the processing returns to step S401. On the other hand, when the CPU 121 determines not to continue marker image capturing (NO in step S408), the processing proceeds to step S409. The determination of whether to continue marker image capturing is not limited to the exemplary embodiment. As another example, the CPU 121 may determine not to continue marker image capturing under certain conditions, for example, when the number of blocks where marker image capturing is necessary is a predetermined value or below or when the degree of bias in the distribution of blocks where marker image capturing is necessary is a predetermined value or below. Further, these conditions may be combined.

As yet another example, the CPU 121 may determine whether to continue marker image capturing in response to a user input. Further, the CPU 121 may make this determination by using a user interface for allowing the user to input whether to continue marker image capturing. For example, the CPU 121 may determine whether to continue marker image capturing by receiving the depression of a button on a graphical user interface (GUI) screen or a keyboard operation performed by the user. Automatically determining whether to continue marker image capturing enables expecting the effect of suitably making the determination regardless of the user's knowledge and level of skill about the apparatus. Meanwhile, introducing a mechanism for allowing the user to make the determination enables expecting the effect of suitably making the determination when automatic determination is difficult.

In step S409, the calibration unit 310 performs the calibration of the target camera 110 based on the positional coordinates of the marker obtained in step S402. When the user moves according to the moving destination information, the calibration unit 310 can also perform calibration referring to the positional coordinates of the marker after movement. The calibration unit 310 performs the calibration of the camera 110 based on Structure from Motion. This method enables calculating camera positions and orientations based on the marker point group on the image. The following document can be referred to for Structure from Motion.

Pierre Moulon, Pascal Monasse, and Renaud Marlet "Adaptive structure from motion with a contrario model estimation" ACCV2012

In step S410, the moving destination determination unit 307 determines a moving destination candidate area. The processing in step S410 is similar to the processing in step S405, i.e., processing for generating a candidate area map 800. In the processing in step S410, the moving destination determination unit 307 may be able to determine whether a marker point is misdetected, in the process of Structure from Motion, and use this determination as the determination of marker misdetection.

In step S411, the calibration unit 310 determines whether the calibration has succeeded. When the positions and orientations have been obtained for all of the cameras 110 through Structure from Motion, the calibration unit 310 determines that the calibration has succeeded. When the position and orientation cannot be obtained for any one of the cameras 110, the calibration unit 310 determines that the calibration has failed. When the calibration unit 310 determines that the calibration has succeeded (YES in step S411), the processing proceeds to step S412. On the other hand, when the calibration unit 310 determines that the calibration has failed (NO in step S411), the processing proceeds to step S413.

In step S412, the notification unit 309 outputs information when the calibration has succeeded, to the portable terminal apparatus 130 to display the information on the display 131 of the portable terminal apparatus 130. In the information when the calibration has succeeded, the candidate area map 800 determined in step S410 is drawn with gradations of red on the image as described in step S901. As information when the calibration has succeeded, the notification unit 309 may further output the candidate area map 800 with the position and orientation of the camera 110 plotted thereon or output estimation errors. In step S413, the notification unit 309 outputs information when the calibration has failed, to the portable terminal apparatus 130 to display the information on the display 131 of the portable terminal apparatus 130. In the information when the calibration has failed, the candidate area map 800 determined in step S410 is drawn with gradations of blue on the image as described in step S902. As information when the calibration has failed, the notification unit 309 may further output the name and number of the camera 110 with which the calibration has failed. Even upon reception of the information output in steps S412 and S413, the portable terminal apparatus 130 displays on the display 131 the moving destination candidate screen 1000 illustrated in FIG. 10 in which moving destination candidates are displayed with gradations of a color.

As described above, according to the present exemplary embodiment, the image processing apparatus 120 can present moving destinations and a moving path to the user. Therefore, the user holding a marker can easily grasp the moving destinations of the marker for marker image capturing required for calibration. Specifically, the image processing system 100 can detect the suitable number of markers at suitable positions, making it possible to perform calibration on the positions and orientations of the cameras 110 with sufficient accuracy. Presenting locations where the marker acquisition is necessary to the user enables suitably capturing marker images, enabling expecting the effect of improving the success frequency and accuracy of calibration. This also enables expecting the effect of suitably performing the calibration regardless of the user's knowledge and level of skill about the camera calibration.

A first modification of the present exemplary embodiment will be described below. In step S403, when a marker group at a similar position is included in the past marker groups, the marker group detected in step S402 is canceled. Preventing collection of a marker group at a similar position enables preventing concentration of markers at specific positions on a specific image or three-dimensional positions. When an extremely large number of markers exist in a specific area than in other areas on the image, calibration excessively adapts to the specific portion resulting in an increase in the number of errors in the other areas. Therefore, the calibration accuracy can be expected to be improved by preventing concentration of markers in a specific area. The degradation of the calibration accuracy can be prevented, for example, in a case where an individual holding a marker stands still.

A second modification of the present exemplary embodiment will be described below. Although, in step S411 in the present exemplary embodiment, the calibration unit 310 determined that the calibration has succeeded when the positions and orientations had been obtained for all of the cameras 110, the calibration unit 310 may make the determination based on other conditions. Examples of other conditions include a case where the positions and orientations have been obtained for a predetermined number of cameras 110 or a predetermined ratio of the total number of cameras 110, or a case where position and orientation estimation errors are threshold values or below. There may be provided a method for visually presenting a result of estimation of camera positions and orientations or numerically presenting estimation errors to the user and a method for allowing the user to select whether the calibration has succeeded, based on the visualized result or the numerical values.

A third modification of the present exemplary embodiment will be described below. The display form in the moving destination candidate screen 1000 displayed on the display 131 is not limited to the exemplary embodiment. As another example, the portable terminal apparatus 130 may selectively display results of some of a plurality of the cameras 110, for example, cameras 110 with which the calibration has failed, cameras 110 with which the calibration is not possible, cameras 110 with which marker collection is insufficient, and cameras 110 having large position and orientation estimation errors. The portable terminal apparatus 130 may change the display order of the results of the cameras, for example, based on whether the calibration is possible, the degree of insufficiency of the marker image collection, the number of markers, and estimation errors. Selectively notifying the user of the instruction information in this way makes it easier to identify cameras 110 having a calibration problem and cameras 110 having a large problem.

A fourth modification of the present exemplary embodiment will be described below. The image processing system 100 according to the present exemplary embodiment output information indicating areas where the marker image collection is necessary. Instead of this method, the image processing system 100 may output information indicating areas where the marker image collection is completed. These pieces of information are substantially equivalent because areas where the marker image collection is necessary and areas where the marker image collection is not necessary are in an inverse relation. In this case, in step S504 illustrated in FIG. 5, the moving destination determination unit 307 needs to assign a lower degree of importance to an area having a smaller marker count.

A fifth modification of the present exemplary embodiment will be described below. Processing for totaling marker counts is not limited to the exemplary embodiment. Although, in the present exemplary embodiment, marker counts have been totaled for each 5×5 area, areas where the marker image collection is necessary and areas where the marker image collection is not necessary may be presented to the user by using a method for plotting marker points as point groups and a method for using contour lines and a heat map according to the point group density.

A sixth modification of the present exemplary embodiment will be described below. Although, in the present exemplary embodiment, the marker is a red ball, the marker is not limited thereto and may be an object having another shape or color. The marker may be a surface on which a two-dimensional code like the Quick Response (QR) code (registered trademark) is printed. Further, an object holding a marker, an individual's face or head, or a body part of which positions are recognized may be used as a marker.

A seventh modification of the present exemplary embodiment will be described below. A marker may be moved by other than a person. For example, the notification unit 309 may output moving destination information to an unmanned machine such as an autonomous robot, vehicle, or drone with a marker attached thereon to guide the unmanned machine. The notification unit 309 notifies the unmanned machine of a moving path or a moving direction via wireless communication, wired communication, or sound. Then, the unmanned machine moves in the notified moving path or moving direction. Expected effects include the effect of saving the calibration and the effect of performing the calibration regardless of the operator's knowledge and the level of skill about the camera calibration when the marker automatically moves.

An eighth modification of the present exemplary embodiment will be described below. The processing for determining whether the calibration is possible in step S501 in FIG. 5 is not limited to the exemplary embodiment, and may be based on information including three-dimensional camera positions and orientations through other techniques. For example, the moving destination determination unit 307 may use an essential matrix, a multifocal tensor, and a projection matrix. Further, the moving destination determination unit 307 may use a result of Structure from Motion and a result of estimation of camera positions and orientations based on a technique similar to the calibration. According to the present exemplary embodiment, the moving destination determination unit 307 determines whether the calibration is possible by determining whether information including three-dimensional positions and orientations of the cameras 110 has been calculated. Instead of this method, the moving destination determination unit 307 may determine that the calibration is not possible in the case of large estimation errors of information including three-dimensional positions and orientations of the cameras 110 (for example, when estimation errors are threshold values or above).

While the present disclosure has specifically been described in detail based on the above-described exemplary embodiments, the present disclosure is not limited thereto but can be modified in diverse ways within the ambit of the appended claims.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present disclosure has been described with reference to exemplary embodiments, the scope of the following claims is to be accorded the broadest interpretation so as to encompass all such modifications and equivalent structures and functions.

This application claims the benefit of Japanese Patent Application No. 2016-157932, filed Aug. 10, 2016, which is hereby incorporated by reference herein in its entirety.

What is claimed is:

1. An image processing apparatus comprising:
one or more processors; and
a memory coupled to the one or more processors, the memory having stored thereon instructions which, when executed by the one or more processors, cause the apparatus to:
detect positions of an index from respective images captured by two imaging devices, wherein an arrangement of the index in a monitoring area is sequentially changed by a user;
calibrate a position of at least one of the two imaging devices based on the positions of the index arranged at an identical position detected from respective images simultaneously captured by the two imaging devices;
determine a candidate position where the index is to be newly arranged in the monitoring area based on the positions where the index has already been detected in the respective captured images; and
notify the user of the candidate position.

2. The image processing apparatus according to claim 1, wherein the candidate position on the image captured by at least one of the two imaging devices is displayed.

3. The image processing apparatus according to claim 1, wherein a candidate area is determined as the candidate position.

4. The image processing apparatus according to claim 3, wherein a distribution of the detected positions in each of a plurality of areas is obtained and the candidate area based on the distribution is determined.

5. The image processing apparatus according to claim 4, wherein the candidate area is determined with giving priority to areas with a small distribution.

6. The image processing apparatus according to claim 1, wherein the candidate position is displayed on a display device which can be referenced by an operator who moves the index.

7. The image processing apparatus according to claim 6, wherein the display device is provided on a terminal carried by the operator.

8. The image processing apparatus according to claim 1, wherein the index is detected based on a color and a size.

9. The image processing apparatus according to claim 1, wherein the instruction, when executed by the one or more processor, further cause the apparatus to discriminate whether the index detected by the detection unit is to be used for a calibration by the calibration unit.

10. The image processing apparatus according to claim 1, wherein, based on a positional relation between an index detected in the past and a newly detected index, the instructions, when executed by the one or more processors, further cause the apparatus to discriminate whether to use the newly detected index for calibration.

11. An image processing method comprising:
  detecting positions of an index from respective images captured by two imaging devices, wherein an arrangement of the index in a monitoring area is sequentially changed by a user;
  calibrating a position of at least one of the two imaging devices based on the positions of the index arranged at an identical position detected from respective images simultaneously captured by the two imaging devices;
  determining a candidate position where the index is to be arranged in the monitoring area based on the positions where the index has already been detected; and
  notifying the user of the candidate position.

12. A non-transitory computer-readable storage medium storing a program for causing a computer to execute a image processing method, the method comprising:
  detecting positions of an index from respective images captured by two imaging devices, wherein an arrangement of the index in a monitoring area is sequentially changed by a user;
  calibrating a position of at least one of the two imaging devices based on the positions of the index arranged at an identical position detected from respective images simultaneously captured by the two imaging devices;
  determining a candidate position where the index is to be arranged in the monitoring area based on the positions where the index has already been detected; and
  notifying the user of the candidate position.

* * * * *